US009787780B1

(12) United States Patent
Tsao

(10) Patent No.: US 9,787,780 B1
(45) Date of Patent: *Oct. 10, 2017

(54) METHOD AND APPARATUS FOR WEB BASED STORAGE ON-DEMAND

(71) Applicant: Sheng Tai (Ted) Tsao, Fremont, CA (US)

(72) Inventor: Sheng Tai Tsao, Fremont, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,798

(22) Filed: Jul. 20, 2016

Related U.S. Application Data

(60) Continuation of application No. 14/513,444, filed on Oct. 14, 2014, now Pat. No. 9,602,600, which is a continuation of application No. 13/663,710, filed on Oct. 30, 2010, now Pat. No. 8,909,976, which is a division of application No. 12/013,813, filed on Jan. 14, 2008, now Pat. No. 8,639,788, which is a division of application No. 10/713,905, filed on Aug. 12, 2002, now Pat. No. 7,379,990.

(51) Int. Cl.
H04L 29/08 (2006.01)
H04L 12/24 (2006.01)

(52) U.S. Cl.
CPC .......... *H04L 67/16* (2013.01); *H04L 41/0813* (2013.01); *H04L 41/12* (2013.01)

(58) Field of Classification Search
CPC ........................................................ H04L 41/12
USPC .......................................................... 709/203
See application file for complete search history.

(56) References Cited

U.S. PATENT DOCUMENTS 6,606,690 B2 * 8/2003 Padovano ............. G06F 11/201
709/213
6,959,373 B2 * 10/2005 Testardi ................ G06F 3/0601
711/152

* cited by examiner

Primary Examiner — Adnan Mirza

(57) ABSTRACT

The operation efficiency of a large scale distributed computing system across the world wide web is critical to any enterprise or ISP or ASP operation due to a larger number of various different computing units involved. The introduction of a service pool construction protocol can help enterprise, ISP and ASP to achieve a high degree of automation for creating and managing different service pools of for the larger number of computing units in the large scale distributed computing system.

20 Claims, 8 Drawing Sheets

The UDP packet format used by "Virtual SAN Auto Configuration Protocol"

Example of Storage Volume Information of an IP SAN Unit

Note: Each volume may further be partitioned into small chunk of partition.

Direct Attached Storage System:

In-Band Accessed Virtual SAN

METHOD AND APPARATUS FOR WEB BASED STORAGE ON-DEMAND

CROSS-REFERENCE TO RELATED APPLICATION(S)

This application is a continuation of U.S. patent application Ser. No. 14/513,444 filed on Oct. 14, 2014 and now a U.S. Pat. No. 9,602,600, which in turn itself is a continuation of U.S. patent application Ser. No. 13/663,710 filed on Oct. 30, 2012, now a U.S. Pat. No. 8,909,976 which itself is a division of U.S. patent application Ser. No. 12/013,813 filed on Jan. 14, 2008 and now a U.S. Pat. No. 8,639,788, which in turn itself is a divisional application of U.S. patent application Ser. No. 10/713,905 filed on Aug. 12, 2002, and now a U.S. Pat. No. 7,379,990. All above applications and patents are herein incorporated by references in their entireties for all purpose.

FIELD OF THE INVENTION

The present invention generally relates to computer communications network. More specifically, the present invention relates to web based data storage systems.

BACKGROUND OF THE INVENTION

Today's corporate IT professionals typically face many challenges to handle the ever increasing information and data. To handle large amount of data, many organizations expand their storage capacity by employing managed storage systems locally in order to maintaining their normal business operating. A conventional approach is to use IP based network attached storage ("NAS"), which effectively provides data storage and services for end users. Moreover, at the enterprise level, the majority storage systems are directly attached or connected to server(s) or host(s) as shown in FIG. 7. These server(s) and/or host(s) are typically access to raw block data devices through conventional communication connection media, such as traditional IDE, SCSI, Fibre Channel, or Ethernet.

The server, which is directly attached to a storage system as illustrated in FIG. 7 typically has many drawbacks, which are described as following:

a typical conventional storage system is only capable of handling 4 TB (terabytes) of data, which is usually not good enough to meet the demands for a typical enterprise storage system;

The most of servers, which are directly attached to storage systems, have problems for further expanding their storage capacity. Therefore, an organization may require to purchase new servers in order to increase storage capacity;

The storage being attached to a server can only be accessed by the attached server and can not be shared by other servers even if the server has larger amount of storage spaces not being used;

Each attached storage system has to be managed separately and this is a nightmare for IT professionals;

With the attached storage system, the backup/restore has to go through the data network, this will tax or reduce the network performance;

A typical SCSI connection only allows a 12-meter distance for data accessing with 15 storage devices. Similarly, Fibre Channel is limited to 10 kilometers communication distance. Distance limitation effectively prevents them from being the best choice for disaster recovery of the storage system; and The Fiber Channel based storage system cannot handle well for the interoperability. Also, Fibre Channel based storage system is expensive to build and to maintain.

FIG. 8 shows a conventional type of virtual SAN, which is in-band controlled and accessed with which the data path from hosts 1 to the SAN units 4 going through virtual SAN control management station 2. It is not efficient in term of accessing the data by the hosts because the virtual SAN control management station can easily be a performance bottleneck. Similarly, the scalability of this type of virtual SAN is poor.

SUMMARY

With rapid development of high speed communication technology, the problems mentioned above can be solved by an IP based out-band accessed distributed virtual SAN infrastructure illustrated in FIG. 1 of this invention. With this invention, each host 1 can directly access IP based SAN units 4 without going through control management station ("control system") 3. The IP based out-band accessed distributed virtual SAN infrastructure actually represents an example of central controlled distributed scalable virtual machine system (CCDSVM) illustrated in FIG. 9. Wherein, each system units actually is a SAN unit 4, specifically is an IP based SAN unit.

With this invention by referring to the FIG. 1 and FIG. 6, in one embodiment, each SAN unit 4 can be accessed by one or more hosts 1 and each host 1 can access one or more SAN units 4 as illustrated in FIG. 6. In addition, the storage accessing goes directly through communication link 2 between the hosts 1 and SAN units 4 without involvement of the control management station 3. Further, a SAN unit 4 can be dynamically added at any time without interrupting normal data accessing the existing SAN units 4 from the hosts 1. In addition, all SAN units are centrally controlled, monitored, and managed by a control management station 3 through a management console 10 of a console system 14. The control management station 3 may also accept storage volume (or partition) requests from each host 1, and assign the matched volumes (or partitions) on the SAN units 4 to the requested hosts. Therefore, each host 1 could directly access the right volumes (or partitions) on the assigned SAN units without going through the control management station 3 again.

This invention will become understood with reference to the following description, claims, and accompanying figures.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The following terms are used through out this patent application to describe the present invention. A central controlled distributed scalable virtual machine ("CCDSVM") system in one embodiment allows a control management system to control a group of computing systems and to provide distributed services to client systems across the Intranet, Internet, and/or LAN environment. Storage media includes magnetic hard disk drives, solid state disk drives, optical storage drive, and memory card, and others. Storage connection and control media may include controller of IDE, SCSI, Fibre optical, Ethernet, USB, or wireless media, and/or other related cables and others. Each controller for storage media such as Raid, IDE, or SCSI controller may control multiple storage media on a computing system. Storage system includes one or more storage media (devices), storage connection media, and storage media controllers. Storage system also contains related software modules for delivering storage services.

Storage area network ("SAN") is a storage system that is capable of providing block data services to various computer devices (hosts) through storage connection media, such as Fibre-optical cable, Ethernet cable or others by deploying Internet Protocol ("IP") based or non-IP based protocol. The non-IP based protocol, in one example, includes Fibre-Channel protocol. IP SAN uses IP based protocols to provide storage raw block data services. All discussions of the SAN in this invention are within the scope of a model of central controlled distributed scalable virtual machine ("CCDSVM").

DNS stands for domain name service for the Internet network. DNS is an Internet software infrastructure and is capable of identifying network addresses and name for computing systems. For example, the network addresses may be used by a computing system to communicate with the peer systems. A Simple Network Management Protocol ("SNMP") is a standard Internet protocol for managing computing system on a network. A SNMP trap is a user datagram protocol ("UDP") packet, which may be sent by a SNMP daemon on a SNMP agent system to a SNMP network management station via network links.

Figure 1:
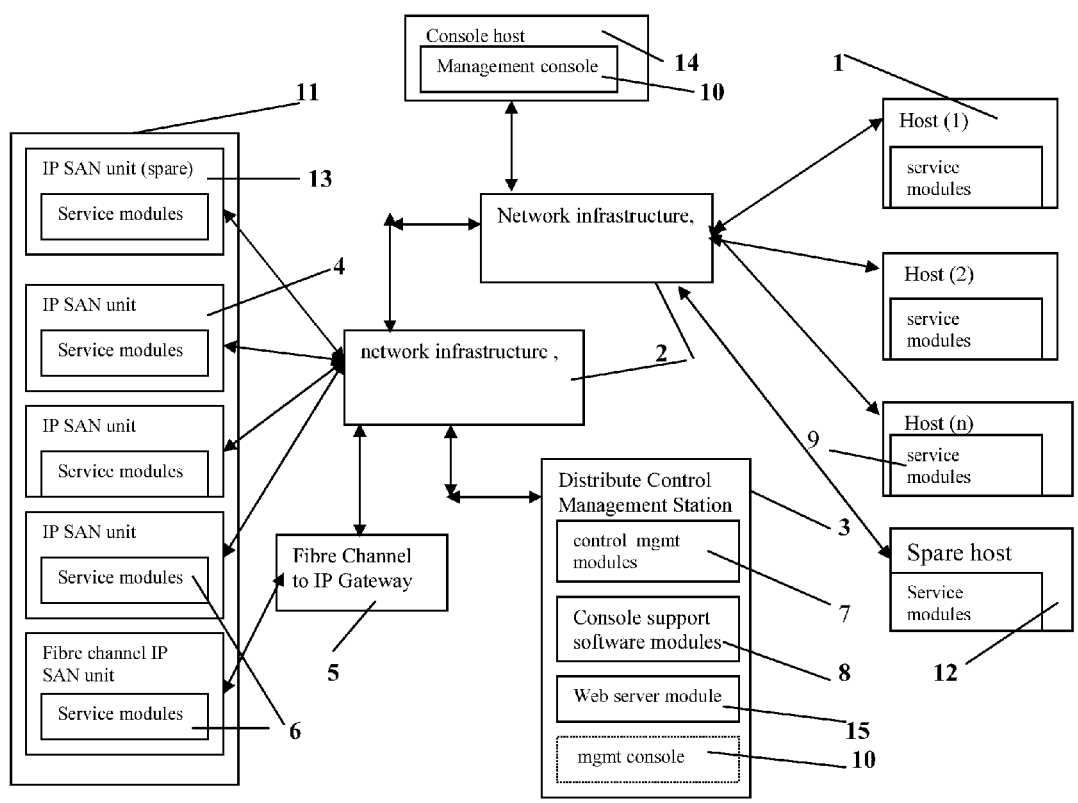
FIG. 1 illustrates a distributed virtual storage area of network ("SAN") infrastructure in accordance with one embodiment of the present invention.

FIG. 1 shows an example of a simplified block diagram of IP based out-band accessed distributed virtual SAN infrastructure. The distributed virtual SAN infrastructure includes multiple hosts 1, network infrastructures 2, a control management station 3, a virtual storage pool 11 having multiple IP SAN units 4, and a management console 10. In one embodiment, each of the hosts 1 contains service software modules 9. The service software modules 9 are configured to communicate with a control management software module 7 of the control management station 3 for obtaining information of a specific one of the IP SAN units 4, and performing tasks distributed from the control management system 3 upon tasks submitted from a management console 10. The service software modules 9 also communicate with service software modules 6 of each of the IP SAN units 4 for access block data provided by the each of the SAN units 4. For example, each of the hosts 1 can create a local file system or create a local database by using raw block data of a storage volume provided by one of the SAN units 4. The service software modules 9 can be coded or implemented with suitable programming languages such as C, C++, Java or others. The service software modules 9 may also use suitable protocols such as IP based or non-IP based protocols.

The host 1, in one embodiment, could be a server, a desktop, a laptop PC, or a communication system or device, which needs to access block data storage. The spare host 12 represents a part of recovery scheme that could be implemented in a CCDSVM environment.

Network infrastructure 2 comprises many kinds of communication links. The network infrastructure 2 could be a storage backbone of an enterprise, a department LAN, a corporate intranet, an Internet infrastructure or others such as WAN (wide area network). In one embodiment, network infrastructure 2 includes switches, routers, gateways, cables (Ethernet, optical Fibre), wireless communication media, or others. The network infrastructure 2 provides data path between the hosts 1, the distribute control management station 3, and the SAN Units 4. The network infrastructure 2 also includes software infrastructure such as DNS or DHCP for facilitating computing systems on said network to identifying a target addresses of a another computing system for sending or receiving data within a network domain or in a cross-domain network environment.

It should be noted that DNS and/or other Internet address identification mechanism may be used when a message or data stream is sent from a system A to a system B across a network, such as via communication link of said network infrastructure.

The control management station 3 includes distributing control management software modules 7 and console support software modules 8. To support web-based console, it requires the web server software 15. The distribute control management software modules 7 communicate with service modules 6 of each of the IP SAN units 4 to retrieve storage information for constructing a virtual SAN storage service pool 11. The communication between the distributed control management software modules 7 and the service modules 6 of each of the IP SAN units 4 is further configured to monitor each of the IP SAN units, and to perform various system operations, which include storage configuration and partitioning and others. The control management software modules 7 also communicate with service software modules 9 of each of the hosts 1 for distributing storage volumes to each of the hosts 1. The distribute control management software modules 7 can be implemented with suitable programming languages such as C, C++, Java, XML, and others. The communication protocols between control management station 3 and IP SAN units 4 could be suitable IP based protocols. The communication between the control management station 3 and hosts 1 can be suitable IP base or non-IP based protocols.

The console support software modules 8 employ interprocess communication mechanism to obtain information relating to each of the IP SAN units (4) from the distributed control management software modules 7. The console support software modules 8 further provide the obtained information to web server software 15 through the inter-process communication mechanism. The console support software modules 8 can be implemented with suitable programming languages such as C, C++, Java, XML, and others.

The web server software 15 communicates with the management console software 10 on the console host 14 through web protocol such as HTTP for providing the obtained information, e.g. via a user interface ("UI"), for centralized storage management for the entire distributed virtual SAN infrastructure across a network. The web server software 15 could be commercially available software or other proprietary software.

To simplify foregoing discussion, the communication path mentioned above will be simply referred to as the console support software modules 8 communicate (send/receive data) with the management console 10 of the console host 14 without further mentioning the role and function of web server software 15 of the control management station 3.

In addition, to support non-web based console, the web server software 15 on the control management station 3 is often not required. In this case, the console support software modules 8 could communicate with the management console software 10 with a suitable protocol other than a web protocol such as HTTP.

Figure 5:
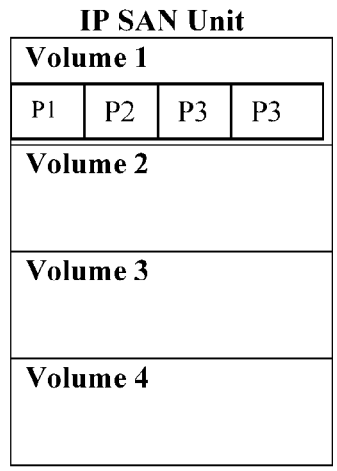
FIG. 5 illustrates an example of storage volume information of an IP SAN Unit in accordance with one embodiment of the present invention.

The virtual storage pool 11 includes multiple IP SAN units 4, wherein each of the IP SAN units further includes service modules 6 and is configured with storage media, storage communications and control media. The storage media of each of the IP SAN units 4 is configured to have one or more logical volumes. Each storage volume, in one embodiment, is further partitioned into several partitions as shown in FIG. 5. Each of the IP SAN units 4 further comprises block data service and other service software modules 6. The service software modules 6 are configured to communicate with distribute control management station 3 for providing storage information and for performing storage operations. The service software modules 6, in another embodiment, are further configured to communicate with service software modules 9 of each of the hosts 1 for providing block data services for the hosts 1. The service software modules 6 can be implemented by suitable programming languages such as C, C++, Java, and others and they may employ suitable IP based communication protocols for data transfer.

In one embodiment, the control management station 3 organizes the IP SAN units 4 to form the virtual storage pool 11. The virtual storage pool 11 may contain information relating to IP addresses, the storage volumes of the block data, their addresses and sizes of each IP SAN unit 4. A spare IP SAN unit 13 represents a part of recovery scheme used in the centrally controlled distributed scalable virtual machine environment.

A Fibre channel to IP gateway 5 is a component that is configured to provide translation between Fibre Channel based protocol and IP based protocol so that a Fibre Channel based SAN unit will appear as if a IP based SAN unit to the rest of the world (FIG. 1).

Fibre channel SAN unit is similar to an IP SAN unit 4 except it uses Fibre Channel storage controller, which uses Fibre Channel protocol to communicate with other parties over a network. In addition, a Fibre Channel SAN unit appears as an IP based SAN unit to the distributed virtual SAN once it connects to the Fibre Channel to IP gateway 5. Therefore, to simplify the foregoing discussion, a fibre channel SAN unit will be treated similarly as an IP SAN unit in all of following discussion without additional comments.

The management console 10 on the console host 14, which has been described in pending patent application of "Concurrent Web Based Multi-Task Support for Control Management System" of application Ser. No. 10/713,904 filed on Aug. 6, 2002 by the same author and is incorporated herein by reference in its entirety. The management console 10 could be a commercially available web browser or a proprietary Web browser. A web browser 10 is able to communicate with web server software 15 on the control management station 3 through a web protocol such as HTTP. The Web browser 10 could be implemented by suitable programming languages such as C, C++, Java, XML, and others. In addition, the management console software module 10 could be a networked software module other than a web browser software. In this case, a suitable network protocols can be used instead of using web protocol such as HTTP.

To simplify the foregoing discussion, the communication path between the management console 10 of the console host 14 and the console support software modules 8 of the control management station 3 will not further mention the role or function of the web server software module 15 in this invention.

From the management console 10, multiple concurrent system operations and tasks can be performed by user for the entire distributed virtual SAN infrastructure. There are may be one or more management consoles of the distributed virtual SAN infrastructure anywhere across the communication network.

Figure 2:
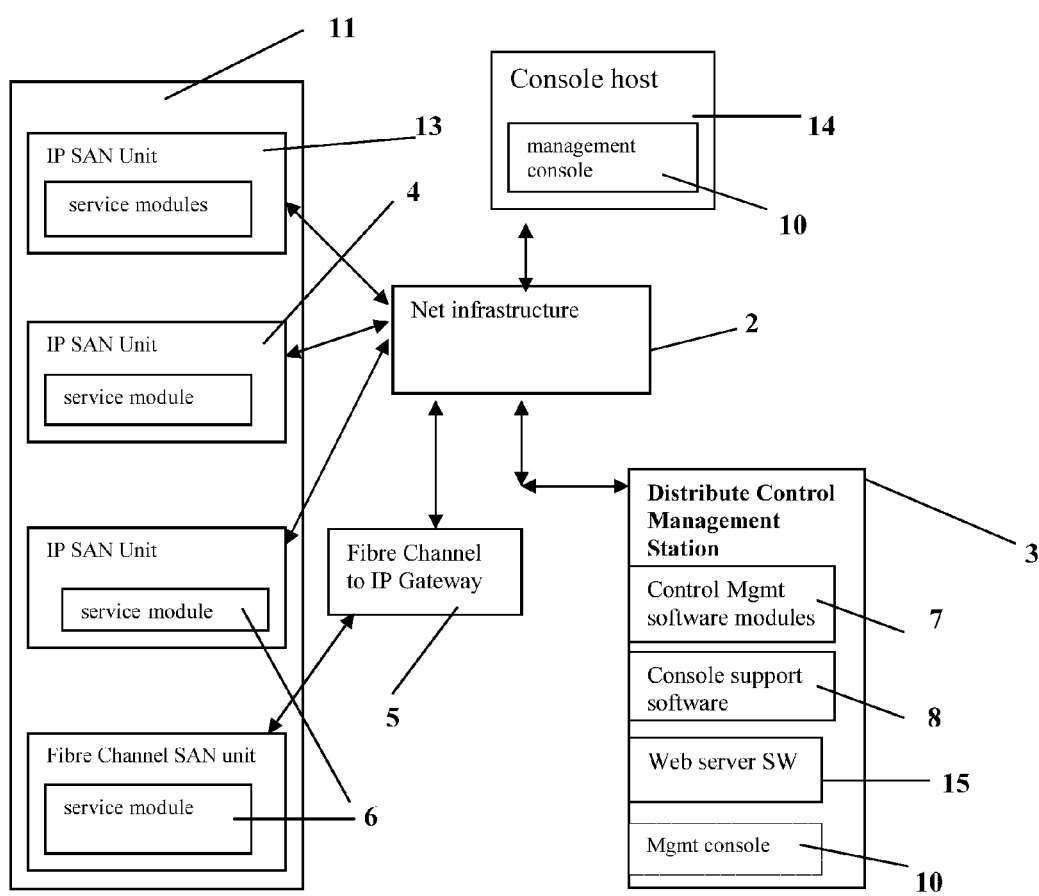
FIG. 2 illustrates actual components of Distributed Virtual SAN in accordance with one embodiment of the present invention.

FIG. 2 illustrates a portion of FIG. 1 relating to an actual virtual SAN. The multiple SAN units 4 form a virtual storage pool 11. The virtual storage pool 11 may contain information of each of the IP SAN units' IP address, the storage volumes and their sizes configured on each storage device.

Figure 3:
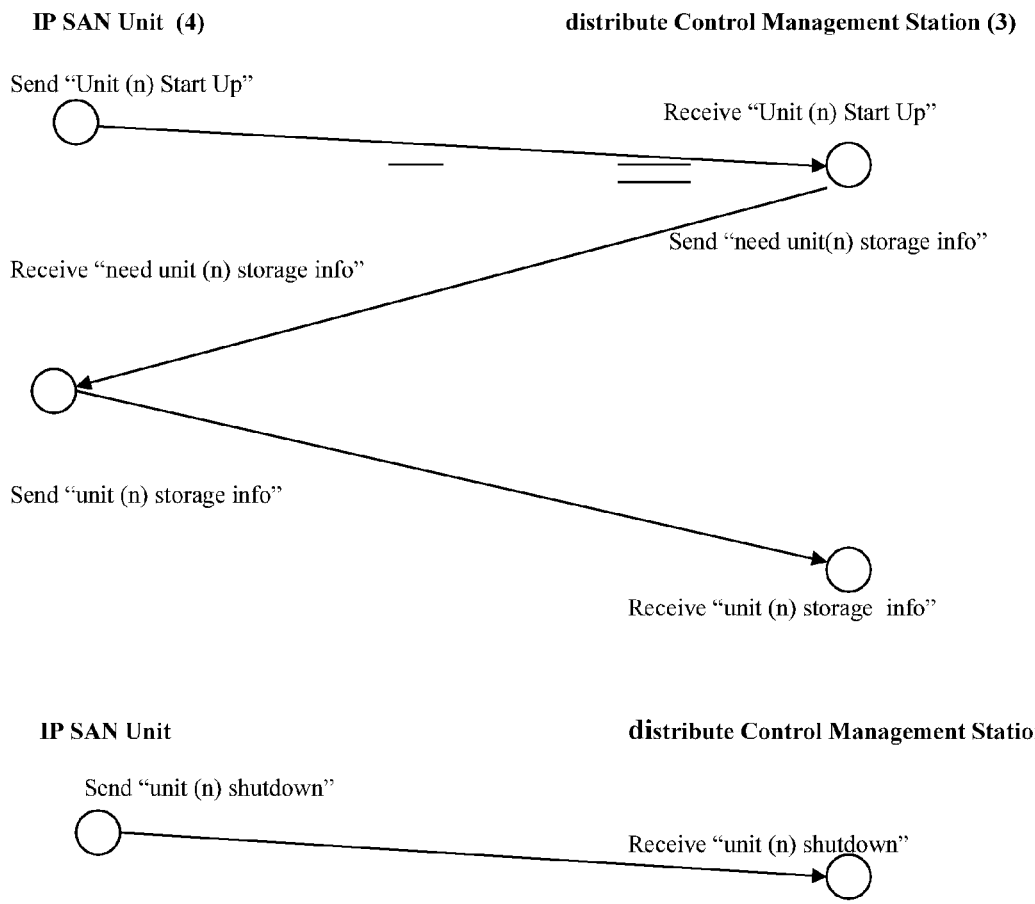
FIG. 3 illustrates Virtual SAN automatic configuration protocol in accordance with one embodiment of the present invention.

FIG. 3 shows a protocol for a virtual SAN automatic configuration as well as for shutting down a SAN unit 4 in the virtual storage pool 11 of the virtual SAN. The packet format used with this protocol is described in FIG. 4.

Figure 4:
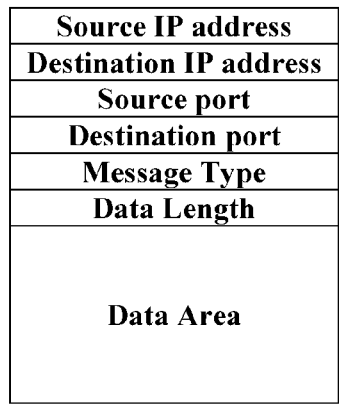
FIG. 4 illustrates a packet format for a Virtual SAN automatic configuration protocol in accordance with one embodiment of the present invention.

FIG. 4 shows the message format, which is used by "Virtual SAN Automatic Configuration Protocol" for sending and receiving a packet. The packet contains both source and designated address information for sender and receiver; therefore, there is no needs for Internet address identification mechanism such as the DNS, or DHCP when the packet is used for sending data across the Internet.

FIG. 5 illustrates storage layout in an IP SAN unit 4, wherein the storage layout may be further divided into multiple volumes and each volume may be further divided into multiple partitions. Each volume refers to a logical storage unit in this discussion and it might contain one or multiple pieces of storage spaces from multiple storage hardware media.

Figure 6:
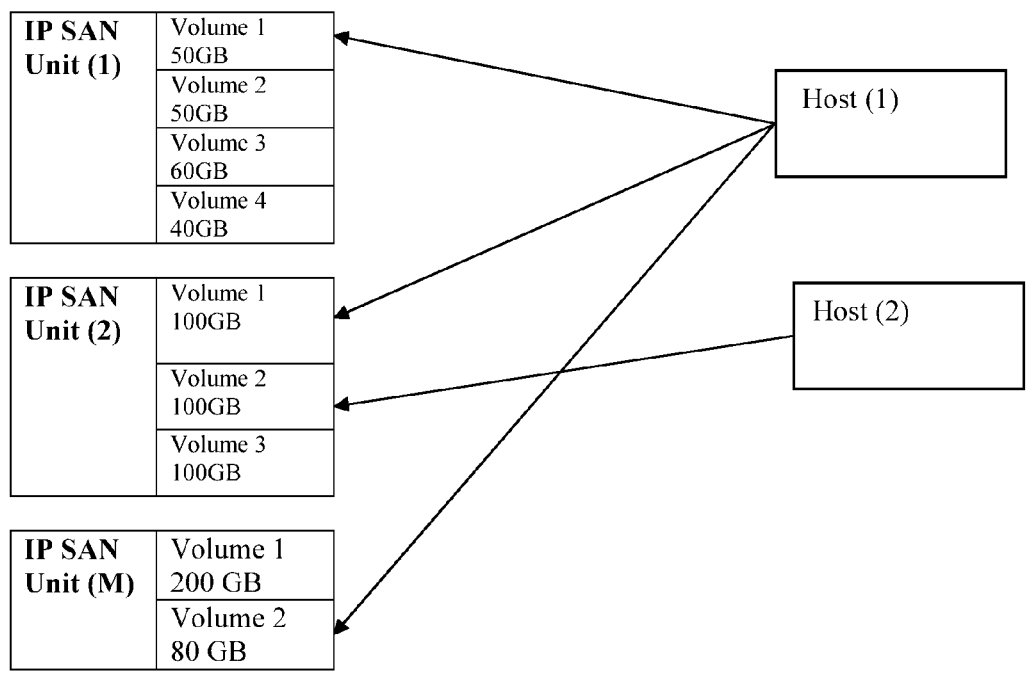
FIG. 6 illustrates a hypothetical example of storage volume requests and assignment in accordance with one embodiment of the present invention.

FIG. 6 is a simplified and a portion of FIG. 1, which shows a hypothetical example of how hosts are configured to access the storage volume of IP SAN units. Where the IP SAN units 4 are a portion of the virtual storage pool 11 and each host is substantially the same as presented in FIG. 1.

Figure 8:
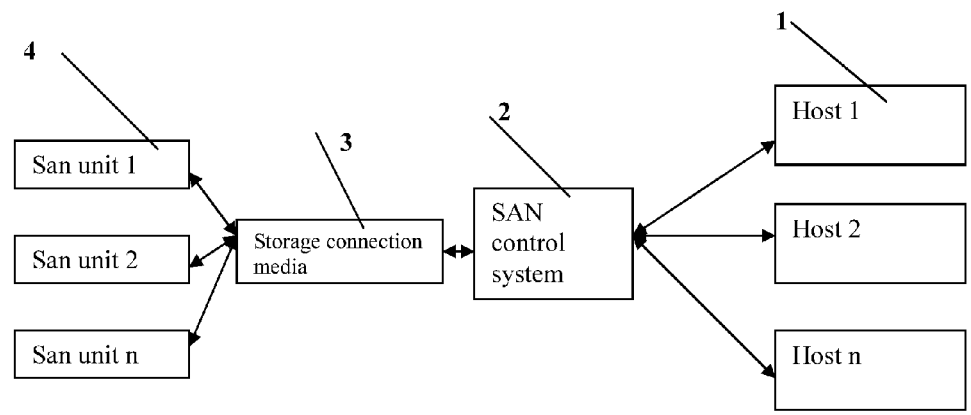
FIG. 8 is an in-bound accessed virtual storage system.

FIG. 8 is a block diagram illustrating an In-Band Accessed Virtual SAN. FIG. 8 shows another type of virtual SAN, where, the actual storage data path from hosts to IP SAN units has to go through control management station.

Figure 9:
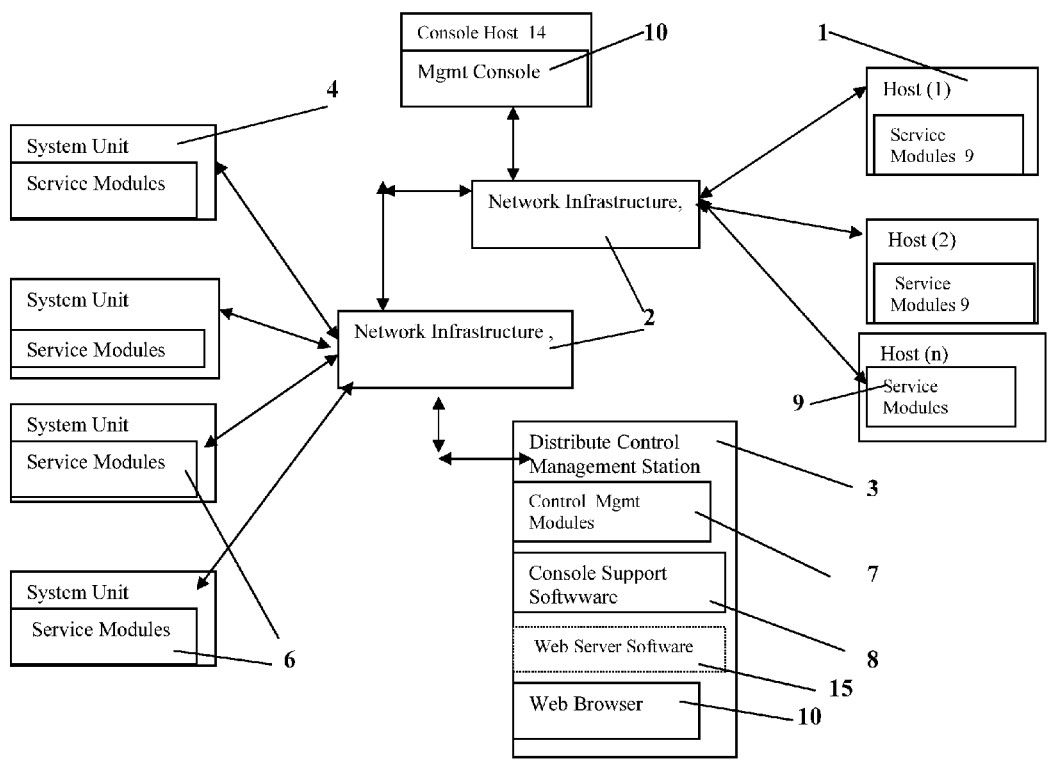
FIG. 9 illustrates a simplified diagram of a central controlled distributed scalable virtual machine system in accordance with one embodiment of the present invention.

FIG. 9 is a Simplified diagram of central controlled distributed scalable virtual machine ("CCDSVM"). With this invention, the systems in a CCDSVM can be flexibly organized into multiple different types of service pools according to their functionalities. For example, multiple IP SAN units can form a virtual SAN storage pool. The hosts of the CCDSVM could form other service pools to provide services other than storage services such as video services, security monitor services, and all other services provided on the world wide web (or across a network), and to provide ability of group based management.

Figure 10:
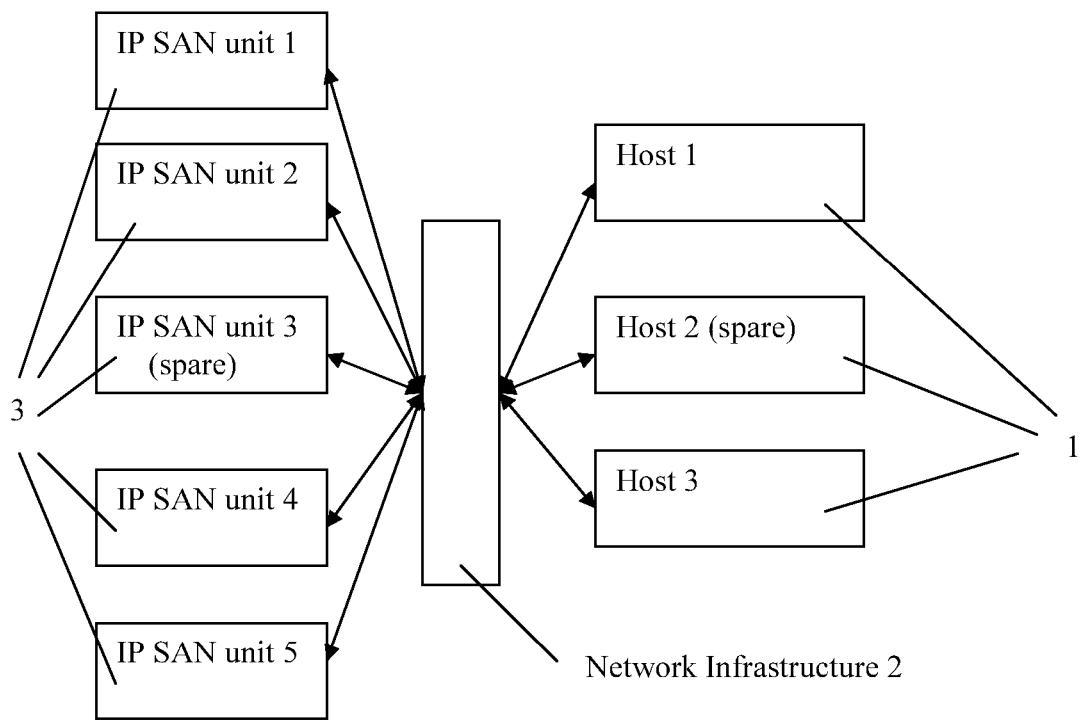
FIG. 10 illustrates a simplified diagram of disaster recovery scheme of a distributed virtual san infrastructure in accordance with one embodiment of the present invention.

FIG. 10 is a simplified diagram of disaster recovery scheme of the distributed virtual SAN infrastructure, which includes one virtual storage pool 11 of multiple IP SAN units 4 and one service pool of multiple hosts 1. For example, host 1 (1) accesses IP SAN units 4 (1) and (2) while host 1 (3) accesses IP SAN units 4 (4) and (5). Also, IP SAN units 4 (1) and (2) are mirrored so that they have kept the same copy of data for host 1 (1). The same to be true for IP SAN units 4 (4) and (5) with host 1 (3). In addition, IP SAN unit 4 (3) may be a spare unit and the host 1 (2) could be a spare host for providing fault replacement in case a fault occurred.

FIG. 1 shows a simplified diagram of a distributed virtual SAN infrastructure according to the present invention. With the distributed virtual SAN infrastructure, the distributed virtual SAN storage pool 11 comprises one or more SAN units 4, which may be further connected to a distribute control management station 3. The SAN units 4 can be accessed by one or more hosts 1 via the network infrastructure 2. The entire distributed virtual SAN infrastructure can be operated through a management console 10.

The virtual storage volume pool 11 of the distributed virtual SAN infrastructure can be initiated and updated when each of the IP SAN units 4 is booted and brought to online. The virtual storage volume pool 11, in one embodiment, is updated when at least one of IP SAN units is powered down or removed from the web environment. FIG. 3 shows the distributed Virtual SAN Automatic Configuration Protocol, which leads to the success of constructing the virtual storage pool 11 of the distributed virtual SAN infrastructure according to this invention. The following steps are for automatic building of the storage volume pool 11 of the distributed virtual SAN based on the protocol illustrated in FIG. 3. The protocol described bellow could be IP based protocol such as SNMP, or a much simple UDP based protocol as illustrated in FIG. 4, or other suitable protocols.

When one of the IP SAN units 4 such as unit (n) brought up online, SAN service modules 6 of the one of IP SAN units 4 sends out a "SAN unit (n) startup" packet, as illustrated in FIG. 4, to the distribute control management station 3. The "SAN unit (n) startup" packet could be a simple user defined UDP packet indicating a storage system labeled with an integer number "n" just being powered up. The message carried by the packet could also be a SNMP trap of cold start packet, or link-up packet if the communication link of the IP SAN unit 4 was previously down, or other short packet/message of a suitable IP protocol.

When the distribute control management modules 7 of the distribute control management station 3 receives the IP SAN unit (n)'s message, it stores the IP SAN unit (n)'s information, such as storing into a storage information list for the virtual storage pool 11.

After storing information of the IP SAN unit, the control management modules 7 on the distribute control management station 3 sends back a "need SAN unit (n)'s storage info" packet to the IP SAN unit (n) 4.

When the SAN service modules 6 of the IP SAN unit (n) 4 receive the packet of "need SAN unit (n)'s storage info", the SAN service modules 6 obtain the storage information on the IP SAN units (n) 4, which may include the number of storage volumes, each storage volume's starting address (logical block address, LBA), length, and the end address (logical block address, LBA). The SAN service modules 6 then send back a packet of "unit (n) storage info", which may include all information obtained, to the control management station 3.

After receiving the "unit (n) storage info" packet from the IP SAN unit (n) 4, the distribute control management modules 7 of on the distribute control management station 3 update the stored information of the virtual storage pool 11 by including corresponding storage information of the IP SAN unit (n) obtained from the packet.

When the IP SAN unit (n) is shutting down, the service module 6 of the IP SAN unit (n) 4 sends a "Unit (n) shutdown" message to the distribute control management station 3. This shutdown message could be an SNMP trap of link down, or a simple UDP packet as illustrated in FIG. 4 with a message type of system down, or other short packet based on some other protocols.

After receiving of the "unit (n) shutdown" packet from the IP SAN unit (n) 4, the distribute control management modules 7 on the distribute control management station 3 update the stored information of the virtual storage pool 11 for the IP SAN unit (n) 4, for example, updating and marking the status of the IP SAN unit number (n) as down in an entry of the storage information list. In addition, other information may be also required to be updated, for example, updating the total size of the virtual storage as well as updating client hosts storage volume allocation information and others.

After one or more IP SAN units 4 are brought online, the control management station 3 obtains the stored information relating to storage volumes and network for every IP SAN unit 4 in the virtual storage pool 11. Therefore, the control management station 3 is able to distributed storage volumes to hosts 1 in several steps illustrated below in respect to the FIG. 6:

First, a host 1 numbered as (1) sends a request to the control management station 3 for requesting a storage space, such as for a 80 GB (gigabyte) of storage. Second, the control management station 3 stores information of the host 1 (1) and searches for availability of the 80 GB of storage volume from the virtual storage pool 11. The control management station 3, for example, finds an 80 GB available storage volume labeled as volume number (2) in an IP SAN unit 4 labeled as (M). Third, the control management station 3 sends the requested information of the host 1 (1) to the IP SAN unit 4 (M), where the requested information includes the IP address of the host 1 (1) and the requested storage size. The control management station 3 also sends the storage volume (2) information relating to the IP SAN unit 4 (M) to the host 1 (1), where the storage volume (2) information includes the IP address of the IP SAN unit 4 (M), the storage volume number and the size, the storage volume's address of starting and ending logical address block (LBA). Therefore, all parties of three, namely the control management station 3 and the host 1 (1) and the IP SAN unit 4 (M) are synchronized for keeping the same mapping of the storage volume assignment information. Fourth, once the host 1 (1) and the IP SAN unit 4 (M) get each other's information, the host 1 (1) can directly and independently access the storage volume (2) on the IP SAN unit 4 (M) immediately, and the IP SAN unit 4 (M) in one embodiment is further configured to perform security checking in light of storage accessing by the host 1 (1).

Alternatively, the above described steps for distributing storage volume may also be semi-automatically setup with assisting of operations performed via the management console 10. For example, an administrator via the management console 10 of a console host 14 could manually setup the storage volume (2) of the IP SAN unit 4 (M) to be exclusively accessed by the host 1 (1) as long as the administrator acknowledges that the host 1 (1) needs such size of storage volume. The administrator can also manually setup the host 1 (1) with all information needed to access the storage volume (2) of the IP SAN unit 4 (M). Finally, the host 1 (1) can access to the storage volume (2) of the IP SAN unit 4 (M) directly without going through the control management station 3.

The present invention also discloses a mechanism of dynamically expanding storage capacity. After the distributed virtual SAN storage pool 11 is built, each of the hosts 1 will be able to access the storage volumes on one or more of the IP SAN units 4 in the pool 11 directly without further involvement of the control management station 3. This will allow the virtual storage pool 11 of the distributed virtual SAN infrastructure to continue adding one or more SAN storage units 4, without affecting the hosts 1 to continue accessing the storage volumes on the assigned IP SAN units 4 in the virtual storage pool 11. This guarantees that the distributed virtual SAN storage pool 11 can be dynamically expanded without interrupting normal storage operations and accessing of the entire distributed virtual SAN storage pool 11.

The present invention further discloses a technique of system scalability. Once the distributed virtual SAN storage pool 11 is constructed, each host 1 can access one or more IP SAN units 4 in the virtual storage pool 11 of the distributed virtual SAN infrastructure whenever the host 1 sends a request. For example, the host 1 (1) illustrated in FIG. 6 can access three IP SAN units that numbered as SAN unit 4 (1), unit (2), and unit (M) after the host 1 (1) requests for storage volumes and subsequently, the control management station 3 grants each of the requests. This effectively provides scalable storage system for the hosts 1 (1) within distributed virtual SAN infrastructure of this invention. Further, the distributed virtual SAN infrastructure provides far better scalability than the in-band accessed virtual SAN as illustrated in FIG. 8, wherein the scalability of in-band accessed virtual SAN were severely limited by a bottle-necked control management station.

The present invention also discloses a method of storage sharing mechanism. Once the distributed virtual SAN storage pool 11 is constructed, each IP SAN unit 4 in the virtual storage pool of distributed virtual SAN infrastructure may be hold multiple storage volumes in the form of block data, which can be accessed by one or more hosts 1. Therefore, this allows multiple hosts (1) to share an IP SAN unit 4 by granting and assigning each of the hosts to exclusively access one of the storage volumes on the IP SAN unit 4. The FIG. 6 demonstrates such a storage sharing, where the IP SAN unit 4 number as (2) has three volumes, which named as volume (1), volume (2), and volume (3). The block data service modules 6 of the IP SAN unit 4 (2) allows volume (1) to be accessed exclusively by a host 1 (1) while volume (2) to be accessed exclusively by a host 1 (2).

Figure 7:
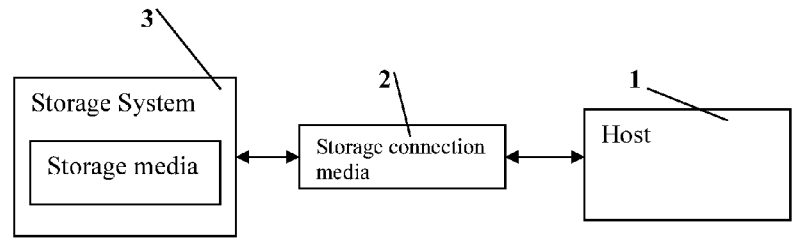
FIG. 7 is a conventional Direct Attached Storage System.

With in-band accessed traditional SAN as illustrated in FIG. 8, the control management station could be a performance bottleneck. With distributed virtual SAN of this invention, each host 1 can directly and independently access a IP SAN unit 4. Therefore, the performance of storage accessing by each host will not be affected by the control system, yet can match the performance of directly attached storage system as illustrated in FIG. 7 when the high speed network connecting media is deployed in the distributed virtual SAN infrastructure.

The present invention also illustrates a method of a centralized management of distributed virtual SAN infrastructure for all IP SAN units 4, control management system 2 and hosts 1 within the infrastructure. As discussed before, the storage management console 10 on a console host 14 can communicate with the console support software module 8 of on a control management station 3 and further obtain information relating to all IP SAN units 4 from the control management modules 7 of the control management station 3. Therefore, the management console 10, e.g. through a user interface ("UI"), can provide centralized management functionality for the entire distributed virtual SAN storage pool 11, for the hosts 1, and for the control management station itself 3. With multiple concurrent tasks controlled by the console support software modules 8 of the control management station 3, the storage management console 10 can provide a full range of system operations and tasks. In addition, multiple tasks and operations can be run concurrently throughout the entire distributed virtual SAN and the hosts 1. These management tasks include storage configuration, storage volume allocation or de-allocation, and storage assignment, storage partitioning and repartitioning, storage backup or restore, fault handling, and monitoring status of storage, network, and other resource usage and activities.

This invention also discloses multi-level security management mechanism for provide security protection for the entire IP virtual SAN infrastructure. At control management system 3 level, an authentication process can be enforced for users e.g. validating user name and password to determine if a user is allowed to access management console 10, and also validating if a user is permitted to perform a specific task for IP SAN unit 4 or host. At IP SAN units 4 and host level, a validation can be made if a particular host is permitted to access storage volume on a specific IP SAN unit 4.

In one embodiment, the present invention discloses a process of disaster recovery mechanism. The use of DNS or an IP address identification mechanism can help this distributed virtual SAN infrastructure to overcome the geometric (region) limitation, and works well in a cross network domain environment or in a single network domain environment. Therefore, the IP SAN units 4 or hosts 1 as well as a control management station 3 could be anywhere on the corporate Intranet, department LAN, WAN or Internet. As a result, the present invention can be used for an emergency or a disaster recovery plan because the distributed virtual SAN infrastructure can be implemented with a range beyond 100 miles as oppose to the traditional 10-kilometer limitation.

In addition, the disaster recovery plan of distributed virtual SAN infrastructure can be flexibly implemented as showing in FIG. 10. With this recovery plan, the host 1 numbered as (1) or (3) can continue to operate even if one of mirrored IP SAN units 4 serving the host (1) or host (3) is failed. Also, a spare IP SAN unit 4 can be used to quickly replace the failed IP SAN unit 4 whenever there is a need. On the other hand, the hosts 1 illustrated in FIG. 10 also can be organized into a service pool for providing special services, such as distributing video services, distributed database pool for database service, distributed security monitor services, and all other services provided on the network or the World Wide Web. Therefore, whenever the host 1 (1) or (3) failed, a spare host 1 (2) can quickly take over the host 1 (1) or the host 1 (3)'s assigned storage in a IP SAN unit 4 and replace the host 1 (1) or the host 1 (3) for continue providing services to the end user computing devices.

It should be noted that the storage of a IP SAN unit 4 can be shared and accessed by multiple hosts. To scale a virtual storage, a host may be assigned to access multiple volumes of storage capacities from multiple IP SAN units. In one embodiment, the storage access goes directly through communication link between hosts 1 and SAN units 4, which means that it is an out-band access. An advantage of using the present invention is that it has better performance and scalability than that in-band accessed virtual SAN. Furthermore, the present invention allows the virtual storage pool 11 to expand dynamically through adding more IP SAN units into the pool 11 without interrupting systems operation.

The distributed virtual SAN infrastructure can be managed and monitored from a centralized console 10. Also, the IP based distributed virtual SAN infrastructure is a new type of central controlled distributed scalable virtual machine (CCDSVM). The software modules implemented in the IP based distributed virtual SAN infrastructure are formed a web based virtual operating system model. Furthermore, the methods and principles of automatically constructing the IP based distributed virtual storage pool can be applied to many other type of distributed virtual machine, e.g. to automatically build different type of application service pools for hosts delivering various on-demand service and to provide ability of group based management. The present invention can also apply to various data distribution services within the CCDSVM infrastructure. To effectively apply the method and principle of automatic constructing virtual storage pool of this invention to other types of service pools, each host need to be configured to provide a specific service, for example for a host providing video service. In addition the "storage information" in the protocol for automatic constructing storage service pool need to be replaced by a specific service information, for example replaced by "video file information" for video service. Thus a specific application service pool can be automatically created to deliver the specific service to client system. In addition, the different type of application service pools will have similar advantages as the storage service pool does, such as dynamical capacity expanding, scalability, performance, disaster recoverability, security, centralized management and support service on-demand.

What is claimed is:

1. A method for a control server controlling automatically forming a plurality of service pools in a web system, through execution of a service pool automatic construction protocol between the control server and each of a plurality of servers across a network infrastructure, said protocol executed by the control server comprising:
    receiving a packet from a first one of the servers, the packet informing the control server that the first one of the servers is going online upon the first one of the servers being bought online;
    storing, via the packet received, identification of the first one of the servers, and
    sending an enquiring packet back to the first one of the servers for requesting information of a specific service that the first one of the servers will deliver;
    receiving a response packet from the first one of the servers, the response packet comprising detailed information of the specific service deliverable by the first one of the servers; and
    assigning the first one of the servers to a first one of the service pools according to the received information of the specific service deliverable thereof; and
    updating the stored information of the first one of the servers fir the first one of the service pools by including the detailed information of the specific service obtained from the response packet.

2. A control server comprising:
    at least one storage network control medium, and
    one computer-readable storage device comprising program instructions, that when executed by the control server, cause the control server to control centralized operations for a plurality of storage servers and a plurality of host devices in a web system across a network infrastructure, wherein the control server controls:
    constructing, automatically, one or more storage service pools via executing a storage serviced pool construction protocol between the control server and each of the storage servers across a first network;
    constructing, automatically, one or more application service pools via executing an application service pool construction protocol between the control server and each of the host devices across a second network;
    presenting the storage and application service pools on a web console for centralized monitoring and operating of the storage servers and host devices; and
    processing a request for accessing one of the storage or application service pools in response to the request received from the web console, from one of the host devices or from a client device.

3. The control server of claim 2, wherein said constructing one or more storage service pools further comprises: executing a storage service pool automatic construction protocol between the control server and each of network attached storage ("NAS") servers among the plurality of storage servers to form a NAS service pool.

4. The control server of claim 2, wherein said constructing one or more storage service pools further comprises: executing a storage service pool automatic construction protocol between the server and each of storage area network ("SAN") servers among the plurality of storage servers to form a SAN service pool.

5. The control server of claim 2, wherein said constructing one or more application service pools further comprises: executing an application service pool automatic construction protocol between the server and each of the host devices to assign the each of the host devices, according to a specific service deliverable thereof, into a corresponding one of the application service pools.

6. The control server of claim 2, wherein each of the application service pools further is one of a video service pool, web service pool, file service pool, security monitoring service pool, or database service pool.

7. The control server of claim 2, wherein each of host devices in the application service pools utilizes one or more storage volumes in one or more storage servers in one or more of storage service pools for delivering a specific application service.

8. The control server of claim 2, where in said presenting the storage and application service pools on a web console comprises: each of the storage and application service pools represented by a information list comprising stored information of each of storage or application servers and associated service thereof in the each of the storage or application service pools.

9. The control server of claim 2, wherein said request, from the web console, further is processed for replicating data, configuring and partitioning storage, backing up or restoring data, managing fault handling, setting up security, or monitoring status for one or more storage servers or host devices.

10. The control server of claim 2, wherein said request, from a client device, further is processed for accessing a video, the control server distributing the request to a host device in the one of the application service pools, the host device configured to deliver the video for video service by utilizing storage volume in a storage server in one of storage service pools.

11. The control server of claim 2, wherein said request, from one of host devices, further is processed for requesting additional storage, the control server distributing the request to a first storage server in one of the storage service pools having a storage volume satisfying the request for the one of host devices directly accessing the storage volume of the storage server independent of the control server.

12. The control server of claim 11, further comprising: the control server distributing the request to a second storage server in the one of the storage service pools if the first storage server does not have the storage volume available while the second storage server does.

13. The control server of claim 2, wherein each of the first and second networks is part of the network infrastructure comprising: corporate storage network backbone, corporate intranet, the Internet, local area network, or wide area network, and comprises of wired and wireless communication links.

14. The method of claim 1, further comprising:
controlling execution of the service pool construction protocol between the control server and a second one of the servers to assign the second one of the servers into the first one of the service pools, where the second one of the servers is configured to deliver the same specific service as the first one of the servers delivering.

15. The method of claim 1, further comprising:
controlling execution of the service pool construction protocol between the control server and a second one of the servers to assign the second one of the servers into a second one of the service pools, where the second one of the servers is configured to deliver a specific service different from the specific service deliverable by the first one of the servers.

16. The method of claim 1, wherein each of the service pools is one of a storage service pool, or an application service pool for file service, video service, database service, web service, or security monitoring service.

17. The method of claim 16, wherein the storage service pool comprises stored information of a plurality of storage servers among said servers, where said information includes network address, name and storage volumes' information associated with each of storage servers, where said information of the storage volumes comprising at least starting address and size of each of the storage volumes.

18. The method of claim 16, further comprising:
presenting the service pools on a web console for centralized monitoring and operating of the servers in the service pools across said network infrastructure, wherein each one of the service pools is represented by a information list.

19. The method of claim 18, further comprising:
from the web console, monitoring dynamic status of storage and network of one or more servers in one or more of the service pools in response to one of the servers being shutdown, boot up, disconnected or reconnected.

20. The method of claim 4, further comprising:
in response to a request of requiring additional storage for a server in an application service pool, distributing the request to a storage server in a storage service pool having the required storage volume for the server directly accessing the storage volume independent of the control server, upon the request submitted from the web console.

\* \* \* \* \*